US012807896B2

(12) United States Patent
Ruggles et al.

(10) Patent No.: US 12,807,896 B2
(45) **Date of Patent: *Nov. 24, 2026**

(54) PROCESSING LIPID-CONTAINING COMPOUNDS FOR FUEL FEEDSTOCK THROUGH ACID DEGUMMING AND ADSORPTIVE BLEACHING/DRYING

(71) Applicant: OLEO-X LLC, Pascagoula, MS (US)

(72) Inventors: Jon Paul Ruggles, Westlake, TX (US); Andre Ditsch, Bee Cave, TX (US)

(73) Assignee: Oleo-X, LLC, Pascagoula, MS (US)

( * ) Notice: Subject to any disclaimer, the term of this patent is extended or adjusted under 35 U.S.C. 154(b) by 435 days.

This patent is subject to a terminal disclaimer.

(21) Appl. No.: 18/368,435

(22) Filed: Sep. 14, 2023

(65) Prior Publication Data

US 2024/0400936 A1 Dec. 5, 2024

Related U.S. Application Data

(60) Provisional application No. 63/469,795, filed on May 30, 2023.

(51) Int. Cl.

| | |
|---|---|
| ***C11C 1/02*** | (2006.01) |
| ***A23D 9/02*** | (2006.01) |
| ***C10G 3/00*** | (2006.01) |
| ***C11B 3/00*** | (2006.01) |
| ***C11B 3/04*** | (2006.01) |
| ***C11B 3/06*** | (2006.01) |
| ***C11B 3/10*** | (2006.01) |
| ***C11C 1/08*** | (2006.01) |

(52) U.S. Cl.

CPC .................. *C11C 1/02* (2013.01); *A23D 9/02* (2013.01); *C10G 3/42* (2013.01); *C11B 3/001* (2013.01); *C11B 3/006* (2013.01); *C11B 3/04* (2013.01); *C11B 3/06* (2013.01); *C11B 3/10* (2013.01); *C11C 1/08* (2013.01); *C10G 2300/1014* (2013.01); *C10G 2300/1018* (2013.01)

(58) Field of Classification Search

CPC ................ A23D 9/02; C11C 1/02; C11C 1/08

See application file for complete search history.

(56) References Cited

U.S. PATENT DOCUMENTS

| | | | | |
|---|---|---|---|---|
| 3,904,685 | A | 9/1975 | Shahidi et al. | |
| 4,698,185 | A | 10/1987 | Dijkstra et al. | |
| 6,015,915 | A * | 1/2000 | Jamil | C11B 3/001 554/204 |
| 6,172,248 | B1 * | 1/2001 | Copeland | C07F 9/103 554/204 |
| 6,407,271 | B1 | 6/2002 | Deffense | |
| 6,780,321 | B2 | 8/2004 | Chanrai | |
| 8,076,123 | B2 | 12/2011 | Chou | |
| 2008/0182322 | A1 * | 7/2008 | Dayton | C11B 3/003 435/271 |
| 2009/0111165 | A1 | 4/2009 | Chou | |
| 2014/0018561 | A1 * | 1/2014 | Craft | C11B 3/10 554/191 |
| 2016/0229785 | A1 | 8/2016 | Oroskar | |
| 2022/0033731 | A1 | 2/2022 | Abhari | |
| 2024/0392207 | A1 * | 11/2024 | Pandian | C11B 3/04 |
| 2024/0400934 | A1 | 12/2024 | Ruggles | |
| 2024/0400935 | A1 | 12/2024 | Ruggles | |
| 2024/0400936 | A1 | 12/2024 | Ruggles | |

FOREIGN PATENT DOCUMENTS

| | | |
|---|---|---|
| WO | 2014116646 | 7/2014 |
| WO | WO2022214993 | 10/2022 |

OTHER PUBLICATIONS

Univar (www.univarsolutions.com/citric-acid-50-3091008#; downloaded Feb. 25, 2026).*

Ditsch, "Why poultry fat is emerging as a solution to the renewable energy industry's increasing need for diverse biofuel feedstocks," Hydrocarbon Processing, May 2024, available at read.nxtbook.com/gulf_energy_information/hydrocarbon_processing/may_2024/special_focus_ditsch_oleo_x_.html.

Galhardo et al., AOCS Lipid Library, Enzymatic Degumming, section 6 "Use of Phospholipases to Reduce Emulsification Properties of the Phospholipids," available at www.aocs.org/resource/enzymatic-degumming.

Topsoe, Phosphorus Removal _ Catalyst Poison Removal, available at www.topsoe.com/solutions/outputs/conventional-fuels/catalyst-poison-removal/phosphorus-removal.

Hindawi "Refining vegetable oils: Chemical and physical refining" The Scientific World Journal, vol. 2022, Oct. 2020.

Choukri et al., "Improved Oil Treatment Conditions for Soft Degumming," Journal of the American Oil Chemists' Society, Nov. 2001.

Leiske et al., "Synthesis of Biscarboxylic Acid Functionalized EDTA Mimicking Polymers and the Ability to Form Zr(IV) Chelation Mediated Nanostructures," Polymer Chemistry, Issue 16 2020.

AGCS "Chemical Degumming" Etienne Deffense, Lipid Library, Jul. 23, 2019.

Canakci et al. "Biodiesel Production from Oils and Fats with High Free Fatty Acids," American Society of Agricultural Engineers ISSN 0001-2351 2001, vol. 44(6) pp. 1429-1436.

"Cvengros et al., Rapeseed Oil Methyl Esters with Low Phosphorous Content, 1999, FetULipid 101, 261-265" (Year: 1999).

"Gharby et al., Refining Vegetable Oils: Chemical and Physical Refining, Jan. 11, 2022, The Scientific World Journal, vol. 2022, 10 pages" (Year: 2022).

"Grain Trade Australia, Section 10, Fats and Oils, Aug. 1, 2015" (Year: 2015).

(Continued)

*Primary Examiner* — Pancham Bakshi

(57) ABSTRACT

In general, one aspect disclosed features a process for treating a lipid containing compound (LCC), the process comprising: producing a first mixture having a pH lower than 2 by vigorously mixing an acid with the LCC; and producing a second mixture having a pH between 2.5 and 7 by adding a base to the first mixture, wherein a majority of free fatty acid in the second mixture is not converted into soapstock.

22 Claims, 3 Drawing Sheets

(56) References Cited

OTHER PUBLICATIONS

Pham et al. (Selective Extraction of Polyunsaturated Triacylglycerols Using a Novel Ionic Liquid Precursor Immobilized on a Mesoporous Complexing Adsorbent, American Institute of Chemical Engineers, Biotechnol. Prog., vol. 25, No. 5, pp. 1419-1426 Published 2009) (Year: 2009).
Hamden et al. (Modulatory Effect of an Isolated Triglyceride from Fenugreek Seed Oil on of a-Amylase, Lipase and ACE Activities, Liver-Kidney Functions and Metabolic Disorders of Diabetic Rats, Journal of Oleo Science, 66, (6) pp. 633-645 Published 2017) (Year: 2017).
Saint John's (How to Render Beef Tallow, pp. 1-11, Published Nov. 2020) (Year: 2020).
Appropedia (pp. 1-2, Published Apr. 2006) (Year: 2006).
Taipabu et al. (Production of renewable fuels and chemicals from fats, oils, and grease (FOG) using homogeneous and heterogeneous catalysts: Design, validation, and optimization, Chemical Engineering Journal, 424, 130198, pp. 1-19 Published May 2021) (Year: 2021).

* cited by examiner

PROCESSING LIPID-CONTAINING COMPOUNDS FOR FUEL FEEDSTOCK THROUGH ACID DEGUMMING AND ADSORPTIVE BLEACHING/DRYING

CROSS REFERENCE TO RELATED APPLICATIONS

The present application claims priority to U.S. Provisional Patent Application No. 63/469,795, filed May 30, 2023, entitled "PROCESSING LIPID-CONTAINING COMPOUNDS FOR FUEL FEEDSTOCK THROUGH MULTI-STAGE DEGUMMING AND ADSORPTIVE BLEACHING/DRYING," the disclosure thereof incorporated by reference herein in its entirety.

TECHNICAL FIELD

The present disclosure relates generally to processes, systems, and methods for degumming, bleaching, and/or drying lipid-containing compounds. In particular, some implementations may relate to systems processing of lipid-containing compounds for fuel feedstock through degumming and adsorptive bleaching/drying.

BACKGROUND

Lipid-containing compounds (LCC) are important raw materials in various industries such as food, pharmaceuticals, fuels, and cosmetics. They can be obtained from natural sources such as animal fats, vegetable oils, and marine oils. However, these sources often contain impurities such as gums, pigments, and other undesirable substances that need to be removed before the lipid-containing compounds can be used in further processing.

Degumming and bleaching processes are methods for purifying lipid-containing compounds. Degumming conventionally involves the removal of gums and other impurities using water and chemical treatment. Bleaching, on the other hand, is conventionally a process of adsorbing pigments and other impurities using a range of adsorptive materials including activated earth, carbon or silica. Conventional methods of degumming and bleaching are typically optimized for single feedstocks, and have been optimized for a narrow range of feed properties. Further, degumming and bleaching have been historically performed to make lipid-containing compounds useful for human consumption. With the increase in lower grade feedstocks for use in energy and fuel, there is a need for more flexible processes that can process a wider range of feedstocks, and optimize products for energy use rather than human consumption.

There is, therefore, a need for an improved process and system for degumming and bleaching lipid-containing compounds that is more efficient, cost-effective, and results in minimal loss of valuable components of the lipid-containing compounds.

SUMMARY

In general, one aspect disclosed features a process for treating a lipid containing compound (LCC), the process comprising: producing a first mixture having a pH lower than 2 by vigorously mixing an acid with the LCC; and producing a second mixture having a pH between 2.5 and 7 by adding a base to the first mixture, wherein a majority of free fatty acid in the second mixture is not converted into soapstock.

Embodiments of the process may include one or more of the following features. In some embodiments, the LCC is a rendered fat. In some embodiments, the LCC comprises at least one of: beef tallow; fish oil; algal oil; yellow grease; brown grease; white grease; poultry fat; and hog fat. In some embodiments, the LCC has a free fatty acid content of more than 2% on an oleic acid basis. Some embodiments comprise separating an aqueous gum containing phase of the second mixture from a lipid containing phase of the second mixture. Some embodiments comprise removing the aqueous gum containing phase. In some embodiments, removing the aqueous gum containing phase comprises: centrifuging the second mixture.

Some embodiments comprise producing a substantially degummed LCC by treating the lipid containing phase with an adsorbent material. In some embodiments, the substantially degummed LCC has a free fatty acid content above 2%, and a phosphorus content below 3 ppm. Some embodiments comprise vacuum-drying the lipid containing phase prior to treating the lipid containing phase with an adsorbent material. Some embodiments comprise contacting the lipid containing phase with at least one chelate. In some embodiments, producing a first mixture having a pH lower than 2 pH further comprises: mixing the LCC with water and decanting the mixture of the LCC and water prior to mixing the acid with the LCC. In some embodiments, the water is deionized water.

Some embodiments comprise removing spent adsorbent material from the lipid containing phase. Some embodiments comprise holding the lipid containing phase for a selected interval before treating the lipid containing phase with the adsorbent material.

Some embodiments comprise centrifuging the lipid containing phase after contacting the lipid containing phase with the chelate. In some embodiments, the acid comprises at least one of: phosphoric acid; citric acid; oxalic acid; and tartaric acid. In some embodiments, the base comprises at least one of: sodium hydroxide; potassium hydroxide; and ammonium hydroxide.

In some embodiments, producing a first mixture having a pH lower than 2 pH by vigorously mixing an acid with the LCC comprises: treating the lipid-containing compound with water and the acid, producing an acidic mixture. In some embodiments, treating the lipid-containing compound with water and acid comprises: creating a third mixture of the lipid-containing compound and the water by mixing water with the lipid-containing compound; decanting the third mixture of the lipid-containing compound and the water; and mixing the acid with the decanted mixture.

In some embodiments, the adsorbent material is at least one of: a polymer; hydrated silica; and bleaching clay. In some embodiments, the at least one chelate comprises at least one of: sodium salts of Ethylenediaminetetraacetic acid (EDTA); potassium salts of EDTA; EDTA; polymers containing carboxylic acids; sodium chloride; and sodium sulfate. Some embodiments comprise producing the second mixture having a pH between 4 and 6.

BRIEF DESCRIPTION OF THE FIGURES

The technology disclosed herein, in accordance with one or more various embodiments, is described in detail with reference to the following figures. The figures are provided for purposes of illustration only and merely depict typical or example embodiments of the disclosed technology. These figures are provided to facilitate the reader's understanding of the disclosed technology and shall not be considered limiting of the breadth, scope, or applicability thereof. It should be noted that for clarity and ease of illustration, these figures are not necessarily made to scale.

Figure 1:
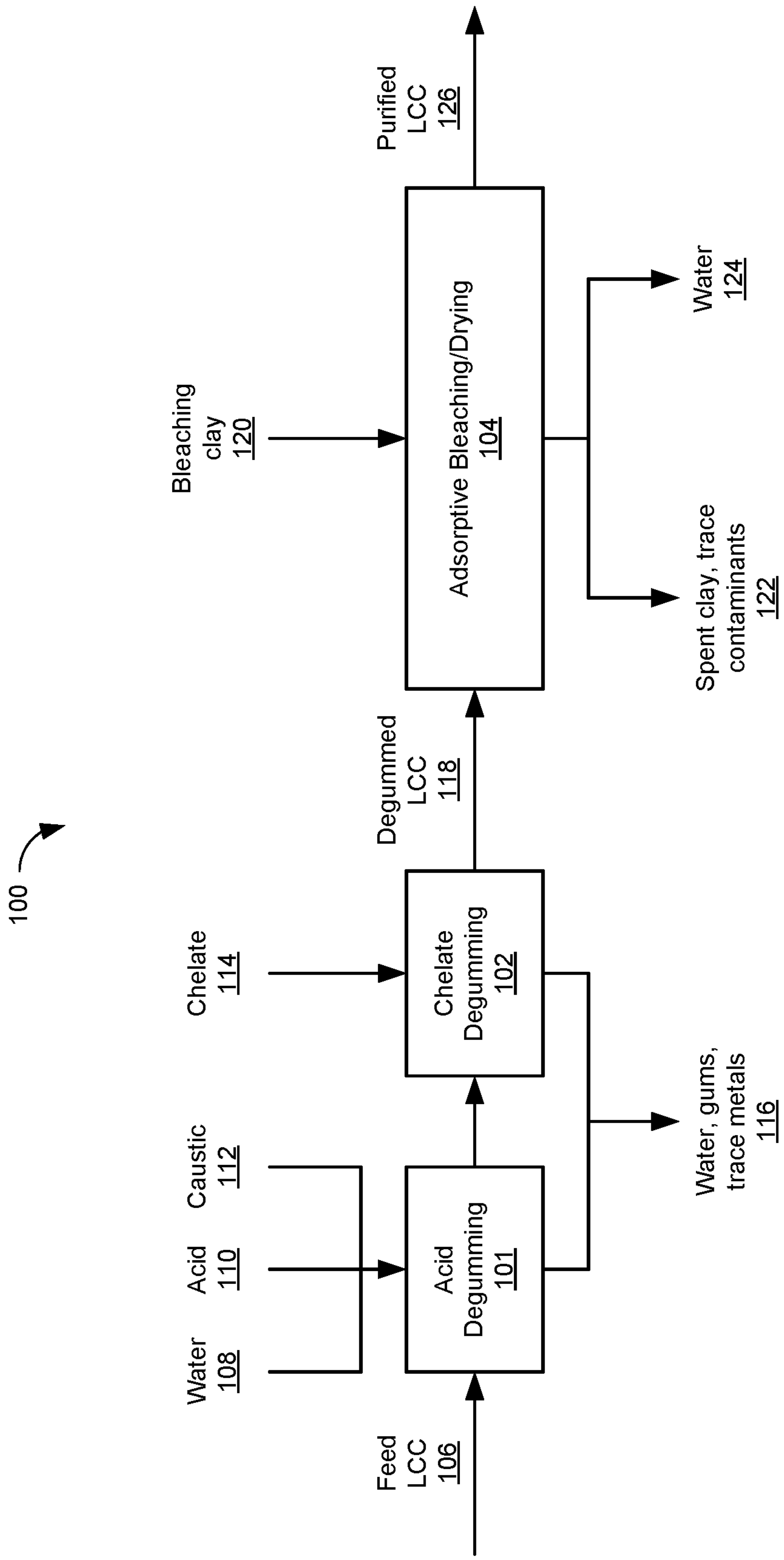
FIG. 1 is a high-level block diagram of a lipid containing compounds refining process, according to some embodiments of the disclosed technologies.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

As biofuel mandates increase, and the demand for low carbon intensity fuels also increases, there is a need to provide robust technologies to convert bio-origin and waste feedstocks into feedstocks that may be converted to useful substances such as fuels.

Historically, the main fuel product from lipid containing materials has been Biodiesel. Biodiesel is comprised of methyl esters, and it substantially different than the hydrocarbon products it replaces. This leads to blending limits, storage incompatibility, an inability to transfer fuel by pipeline and an inability to replace key fuel products such as aviation fuel. When lipid containing materials are subjected to refinery based hydroprocessing to deoxygenate triglyceride and free fatty acid molecules to produce an analog to a hydrocarbon fuel, for example such as diesel and kerosene, the resulting product is a hydrocarbon that is indistinguishable from petroleum derived products. This renewable diesel or jet fuel can then be used in existing infrastructure, and used at higher blend rates, up to and including 100% renewable products.

Historically, triglyceride treatment methods have been tailored to edible oil refining. While the processes and basic chemistry can be leveraged for improving feedstocks for hydroprocessing, the needs of edible oils and hydrotreating units are quite different. Edible oil processing focuses on shelf stability, taste, and color. Biodiesel feedstock preparation is largely focused on reducing free fatty acid content. Refinery hydrotreaters are not impacted by taste or smell. However, very small concentrations, as low as 1 part-per-million, of contaminants such as phosphorous can poison hydrotreating catalysts, dramatically reducing run life and increasing processing cost. Since phosphorous is an integral part of the “gums” of phospholipids that naturally occur in all triglyceride feedstocks, removal of them is essential.

Renewable fuels such as renewable diesel and sustainable aviation fuel that are derived from lipids using conventional middle distillate hydrotreating technology are highly susceptible to premature failure and short catalyst run lengths due to fouling from the contaminants within the renewable feedstocks that are not adequately removed using existing technologies. Premature catalyst failures and shortened operating cycles from fouling are expensive for renewable diesel and sustainable aviation fuel refiners due to the high-costs associated with the changeout of catalysts, which require substantial operating unit downtime, replacement of expensive catalysts, and low-margin transitional periods during startup and shutdown.

These middle distillate hydrotreating technologies often employ a trickle-bed reactor patterned after petroleum refining using a ratio or circulating hydrogen of 3-10 times the hydrogen chemically consumed in converting the feedstock and operating at pressures of 600 psi to 2600 psi and temperatures of 600 F to 750 F. Trickle bed reactors in renewable diesel and sustainable aviation fuel service often use nickel and molybdenum catalysts. These catalysts are solid media with activated metal sites supported by an alumina substrate. Metals, including phosphorus containing compounds, iron, magnesium, sodium, and calcium (either as compounds or elements), are naturally occurring in both plant and animal-derived lipid feedstocks. These metals can cause rapid fouling of the catalyst, even when found in trace volumes (e.g., as low as 1-10 parts per million). In particular, phosphorus-containing compounds can foul catalysts through (1) forming a thin layer of phosphoric glass over the surface of the catalyst which in turn deactivates the active metal sites and also impedes the chemical reaction between the active metals sites and the catalyst’s alumina support layer, and (2) causing permanent plugging of open spaces within the catalyst which are irreversible and lead to rapid catalyst deactivation.

Renewable diesel and sustainable aviation fuel processing is intensive, with 11-12% of the feedstock oxygen, the balance being carbon and hydrogen. All oxygen is removed during processing and converted to carbon monoxide, carbon dioxide, and water through decarboxylation and deoxygenation reactions followed by hydrogen saturation of double bonds and hydrogen saturation of some oxygen to form water. In order to initiate the catalytic reactions listed above, a minimum threshold of heat must be introduced to a mixture of feedstock plus hydrogen in conjunction with pressure prior to the introduction of the feedstock to the catalyst bed. These operating conditions require highly specialized pumps, compressors, heat exchanger vessels, reactors, separators, and post-treatment equipment. The extreme operating conditions often are met by constructing this equipment with advanced metallurgy including austenitic stainless steels (e.g., 304, 316, 317, and 347), chrome alloy steels, and high-temperature steels. Many of these metals are susceptible to rapid failure from trace contaminants, particularly organic chlorides, which are found in renewable diesel and sustainable aviation fuel feedstocks.

Typical treatment of edible oil is performed in purpose-built facilities, usually with a single, well-defined feedstock (e.g., soybean oil). As a result, these operating units do not normally have the flexibility to process more than one type of oil. Furthermore, only one degumming step is employed as that is sufficient to refine edible oils. Higher FFA content (e.g., 4%-20% FFA content) is not normally processed in these facilities.

Conventional treatment of edible oils generally involves crude degumming, acid degumming, alkali refining, water washing, drying, bleaching, and deodorizing. Crude degumming involves intensively mixing the crude oil with water, and then centrifuging to remove the most easily hydratable phospholipids within the water phase, leaving a partially degummed oil in the lipid containing phase. Acid degumming involves adding an acid, typically phosphoric or citric acid, to lower the pH and to extract calcium and magnesium from the phospholipids to make the refractory phospholipids hydratable. An alternative is using a strong chelate like EDTA to perform “soft” degumming in lieu of citric or phosphoric acid.

Alkali refining involves pH adjustment of the added acid and any free fatty acids in the oil, and centrifuging to generate a clean oil and a waste stream including soapstock (free fatty acids in a form complexed with an alkali metal, typically sodium). Alternatively, alkali refining may involve only partial neutralization without removing free fatty acids.

Water washing involves washing the clean oil with hot water to remove any entrained acid, alkali or water, followed by centrifugation. Drying involves removing any water from the oil, typically with gentle heating under vacuum to evaporate residual moisture. Bleaching generally involves adding an adsorbent clay to remove any remaining impurities, then removing the adsorbent clay via filtration. Deodorizing involves removing any remaining compounds using a distillation step, focused on removal of volatile compounds in the oil.

Conventional commercial vegetable oil degumming and bleaching processes suffer from the several disadvantages. These processes typically result in a phosphorous level no lower than 3 parts per million, and as high as 10 parts per million. For human consumption, this level of phosphorus is generally undetectable and presents little concern. In a hydroprocessing unit, 3 parts per million of phosphorus will cause catalyst deactivation within 6 to 12 months (versus 4-8 years for hydrocarbon processing). 10 parts per million of phosphorus will cause accelerated catalyst deactivation within weeks after startup. The disclosed processes enable removal of phosphorus to below 1 part per million, and often achieve a "Non-Detect" reading from sensitive laboratory equipment that can measure to the 0.1 ppm level.

Removing the free fatty acids with alkali refining creates a waste stream. For edible oils with <1% free fatty acids, this waste stream is small. For many highly acidic oil streams like those derived from rendered poultry and pork fat, the free fatty acid content can be as high as 20%, resulting in a massive waste stream and impaired yields.

Current commercial processes are not designed to process multiple feedstocks within the same equipment, where gum content, free fatty acid content, and other contaminants may vary by orders of magnitude. Attempting to use a soybean oil degumming and bleaching production line for poultry fat would lead to several limits on throughput, yield, product quality, and depending on the quality of construction and materials choses, could pose metallurgical issues as well.

Embodiments of the disclosed technologies provide a robust, flexible process that is designed to reduce gums, metals, and other contaminants across of a wide range of lipid-containing compounds such as plant- and animal-derived oil feedstocks. These technologies utilize a multi-step process that is more intense than most edible oil processing, ensuring that sufficient treatment is possible with a wide range of feedstocks.

Further embodiments may adopt conventional degumming and bleaching technology and processes to produce improved and otherwise more efficient lipid-containing compound processing. However, as discussed, conventionally, for edible oil production, it is permissible for substances to contain 3-10 ppm phosphorus content in the finished product. While this does not tend to interfere with flavor or color of the oil, the phosphorus plugs and deactivates hydrotreating unit fixed bed catalysts. Additionally, it has been found that phosphorus contents higher that 1 ppm will degrade RD/SAF yields and shorten the expected run time of a hydrotreater's catalyst. As such, disclosed embodiments may produce significantly cleaner substances—one that approaches zero phosphorus and below 3 ppm total metals content.

Present embodiments provide a new approach to RD/SAF feedstocks and have largely solved the long-standing issues troubling the RD industry including short catalyst deactivation periods, reactor fouling, yield degradation, metallurgical mismatches especially as they relate to corrosion attacks on austenitic stainless steels, and logistics and handling issues present in conventional process design.

In general, present embodiments degum and bleach lipid-containing compounds by decanting, water washing (with acids and bases to react with certain compounds), optionally chelating with EDTA, centrifuging, vacuum drying, and filtering with assistance of a bleaching earth. It is the sequencing and the repetition of various processing steps that may result in a higher quality degummed and bleached lipid-containing compound.

The present embodiments include up to three cascaded steps for the separation of metal-contaminated water and clean product oil using disk stack centrifuges.

Solids and other insoluble substances find their way into raw feedstock through a number of means—including for seed oils, the original crushing and flaking process, contamination through handling and shipping, and contamination paths linked to storage. The removal of these coarse and fine contaminants may be completed through basket filtration and physical separation via a horizontal centrifuge. A countercurrent scroll may operate within the centrifuge's bowl to push solids to a discharge port. The cleaned or decanted oil may proceed to a clean oil discharge port. Due to the slower speed of the centrifuge relative to a disk-stack centrifuge, the quality of the separation between phases may not be perfect, but operational experience has shown that most solids will be removed. In addition, a small addition of water can help remove hydratable phosphatide gums, which may form a viscous layer that commingles with the heavier solids and is discharged.

Embodiments of the present disclosure may include two decanters located at the front end of the process.

Lipid Containing Feedstocks

Embodiments of the present disclosure contemplate the processing of both vegetable oils and animal fats in parallel processing units. In some embodiments, with two discrete degumming lines and two discrete bleaching plants, the process can operate on both types of feedstocks in parallel and optimize the processing conditions for each feedstock. Examples of the raw feedstock qualities are presented below:

| Feedstock Type | Rendered Yes/No | SPG @20 c g/cm3 | Phosphorus PPM | Solids | FFA (Acid) % Vol | Chlorides PPM | Viscosity cP @22 C |
|---|---|---|---|---|---|---|---|
| Crude Soybean Oil | No | 0.91 | 500-1100 | Yes | <0.4% | <10 | 57.1 |
| Crude Degummed Soy Oil | No | 0.91 | 50-240 | No | <0.4% | <10 | 56 |
| Canola Oil | No | 0.92 | 80-600 | No | <0.4% | <10 | 63.5 |
| Palm Oil | No | 0.88 | 20-200 | No | 1-4% | 3-15 | 77.1 |

-continued

| Feedstock Type | Rendered Yes/No | SPG @20 c g/cm3 | Phosphorus PPM | Solids | FFA (Acid) % Vol | Chlorides PPM | Viscosity cP @22 C |
|---|---|---|---|---|---|---|---|
| Used Cooking Oil | Mix | 0.9 | 10-100 | Yes | 2-5% | 3-20 | Range |
| Distillers Corn Oil | No | 0.9 | 100-400 | No | 2-10% | 5-50 | Range |
| Beef Tallow | Yes | 0.88 | 20-300 | Yes | 0-4% | 0-5 | Solid |
| Yellow Grease | Mix | 0.89 | 20-300 | Yes | 2-10% | 3-20 | Range |
| Poultry Fat | Yes | 0.88 | 20-300 | Yes | 2.5-15% | 0-20 | Solid |

End-Products

Once the lipid-containing compounds have passed through the various disclosed processes the end-product may be a deep degummed and super-bleached renewable diesel plant feedstock. Renewable diesel hydrotreaters require a much deeper level of contaminant removal than do the edible oil and animal feed meal industries. High-pressure hydrotreating equipment has been developed conventionally by the petroleum refining industry that is highly susceptible to trace-level contaminants causing shortened production lives for fixed bed catalysts. In particular, trace remnants of phospholipids (from 2-10 ppm) can foul and deactivate hydro processing catalysts and reduce expected catalyst run lengths by 30-90% versus analogs of petroleum-based oil feedstocks. Given that the costs of a typical catalyst change-out (plus the opportunity cost of downtime) can exceed $20 million per instance, the economic penalty of feed that contains catalyst poisons cannot be undercounted when identifying renewable diesel feedstocks. In addition, higher reactor weighted-average-bed-temperatures in order to off-set the catalyst activity rates may become impaired by the phosphorus-compound poisoning, which may further cause significant yield deterioration over the life of the catalyst. The economic losses from this yield slippage can be greater than the economic penalty from short intervals for catalyst changes. The comparison between the needs of current modern hydrotreating equipment and the market for edible refined oils may be exemplified below.

| Finished Product | Total Metals PPM | Moisture % Vol | Phosphorus PPM |
|---|---|---|---|
| Edible Oils (Industry Standard Process) RBD Soybean Oil | 10-30 | 0.30% | 3-10 |
| Hydrotreater-Optimized (Oleo-X Process) Super-Bleached Oil | 2 | 0.20% | 0-0.5 |

Additionally, for lipid containing oils for human consumption, free fatty acid content (FFA) should be reduced to very low levels, well below 1%. For use in renewable diesel production, these free fatty acids can be a useful feedstock, and it may be useful to both process feedstocks of high (>2%) free fatty acid that would not normally be used in foods, as well as retaining the free fatty acids in the finished product. Thus the ability to remove metals, gums and other contaminants while simultaneously retaining FFA is valuable for renewable diesel feedstocks.

The disclosed embodiments may account for processes that start with either vegetable oil, animal oil, or other fatty substances, and result with an end-product of similar quality. The end-product targets may have most, if not all, impurities removed, in the finished substance. This may provide the end-user with a feedstock or substance that may be compatible with legacy processing equipment. Furthermore, production run times may be comparable to current Ultra Low Sulfur Diesel and Ultra Low Sulfur Kerosine hydrotreater run lengths, thus allowing for a continuation of current maintenance, turnaround, and catalyst replacement methodologies in the refining world.

Fundamentals of Seed Oil and Grease Refining

Phospholipids can enter raw oil through the crushing, flaking, and extraction processes for seed oils. For animal-based greases and tallows, soft tissues are deconstructed through steam and heat in a process known as rendering that liberates fats. Soybeans, for example, are crushed or flaked and then have their oil extracted through a hexane solvent.

It is the solvent extraction process, especially with deep recovery of crushed oil, in which the phosphorus-containing compounds enter the seed oil. If one were to extract 100% of recoverable oil, the phospholipids would be fully mobilized and be well above 1000 ppm phosphorus content in the raw product. With extraction of 99% of the available oil in the soybean, it is common to have phosphorus content in the 500-1000 ppm range.

Phospholipids are complex molecules containing phosphorus, often another metal including magnesium or calcium, and a carbon chain (the lipid). The complexity of these molecules allows them to carry out many functions within biology. They are especially important in the wall structures of cells, functioning as membranes. Hence, these molecules have chemistries that are resistant to many forms of industrial processing.

After physical filtration, vegetable oil and grease pretreatment may commence with water degumming. Phospholipids that can be extracted via a simple water wash are classified as Hydratable Phospholipids. Conversely, those phospholipids not hydratable are termed Non-Hydratable Phosphatides or "NHP" for short. There are generally not hard rules on NHP formation due to the complex interactions of the phospholipids in oil and water phases in addition to other metals and compounds.

Phospholipids can be generally categorized into 4 groups—Phosphatidylcholine (PC), Phosphatidylethanolamine (PE), Phosphatidylinositol (PI), and Phosphatidic Acid (PA). The PC is fully hydratable even when bound to an alkali metal ion, such as potassium, or an alkaline earth metal ion, such as calcium or magnesium. It may also entrain other phosphatides. PI is also fully hydratable. PE is hydratable in the presence of other hydratable phosphatides. After water degumming, some PE may be left in the oil and further water degumming does not remove this PE. PA is hydratable when ionized, but not when neutral or as a calcium or magnesium salt.

The first-stage water wash process may remove more than 75% of the phospholipids as the majority of them are hydratable. Multistage water washes may remove additional contaminants until reaching the limit where only NHPs remain. At this point, additional refining steps may be taken. Conceptually, NHP can be extracted into a water phase when faced with a highly acidic water phase below the electric charge of the NHP, which can then be removed. Citric acid and phosphoric acid may be used to create an acidic water phase in acid refining. It is important to note that the acidic water phase usually must make direct contact with the phospholipid and typically only the interface between oil and water can provide a location for the extraction of the NHP. Hence it is relevant for water degumming to have a comprehensive dispersion of water into the lipid containing phase (thus forming an emulsion). However, to note, reducing the pH of the water phase below the acidity of the NHP may allow the NHP to "flip" it's attraction and migrate from the lipid containing phase to the water phase. The lipid containing phase may be neutral and stay neutral as the water phase can be pH controlled.

Some of the success of the refining process comes from an efficient formation of an emulsion and the ability to separate the phospholipid with that water phase from the product. Hence, mixing speed, residence time, and separation through decanting and mechanical separation via centrifuging are focused on, as opposed to the process chemistry.

The purpose of the refining process equipment is to provide an environment that enables the process conditions to speed up to levels useful for industrial chemistry. The relevant process variables to be controlled during the degumming process include the extent of the water/acid distribution, adequate time being provided at the correct temperature for degumming reactions to occur, and then thorough breaking of the water-in-oil emulsion combined with precision separation in the centrifuges, among others.

When done correctly, the end results can be a nearly perfectly degummed (and de-metaled crude when agents like Phosphoric Acid are used) oil that is ready for the bleaching process.

Degumming

Figure 3:
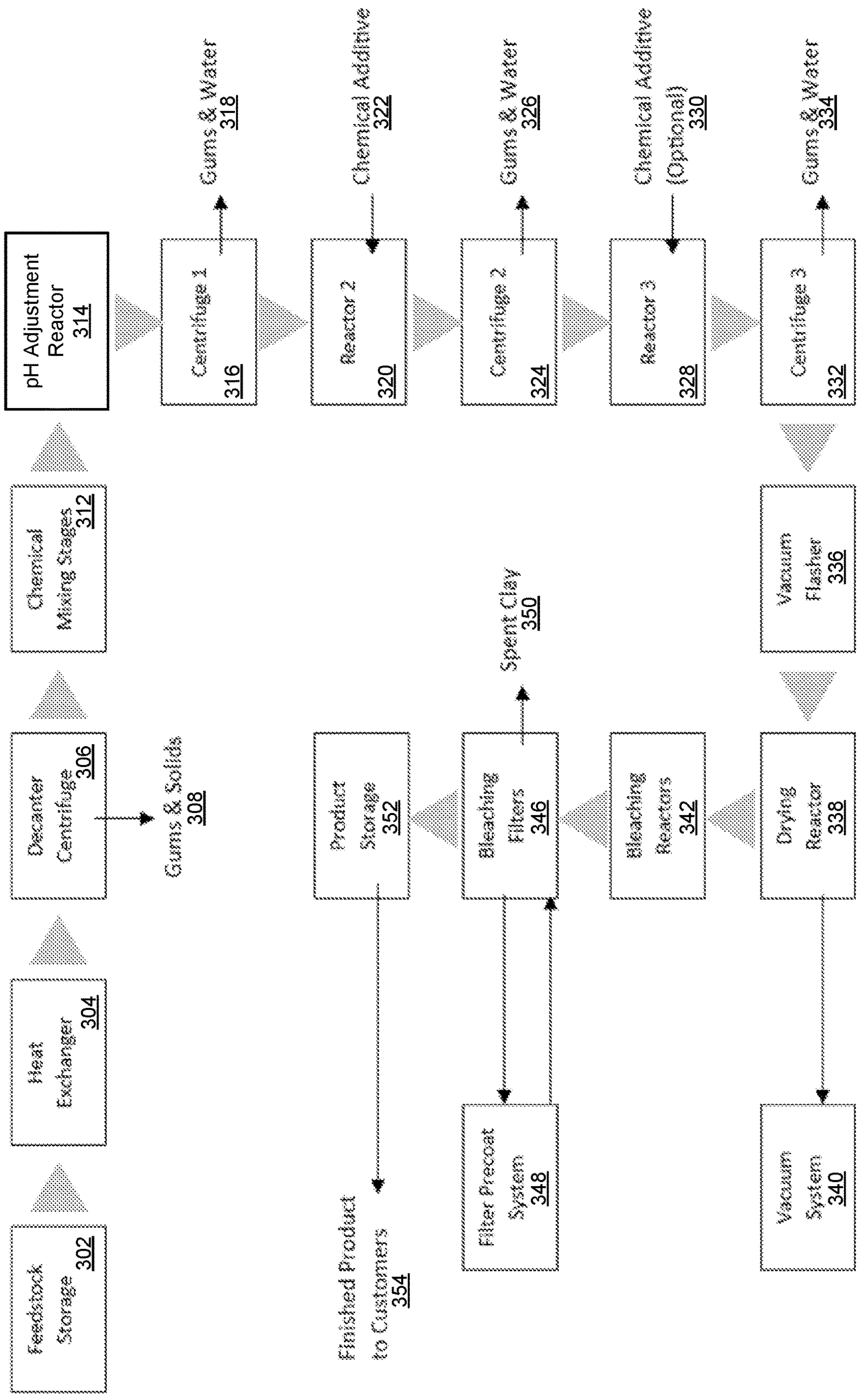
FIG. 3 is a process flow diagram according to some embodiments of the disclosed technologies.

FIG. 3 is a process flow diagram for a process 300 for processing lipid-containing compounds for fuel feedstock through multistage degumming and adsorptive bleaching/drying according to some embodiments of the disclosed technologies. Referring to FIG. 3, The initial feed oil is pumped from Feedstock Storage 302 and heated in a heat exchanger 304 to a desired processing temperature, typically 140-190 F using either batch heating in tank or through an inline heat exchanger. To limit degradation of the oil, it is desired to have this heating process occur rapidly, with as short of residence time as possible. The liquid oil is pumped into a Decanter Centrifuge Stage 306 where deionized water is added to the oil and mixed via an inline static mixer to ensure water distribution throughout the oil. Sufficient mixing is performed to assure contact of oil and water, but typically vigorous mixing is not required. The process can optionally include adding of a solid filter aid (e.g., polymer or spent bleaching clay) to the Decanter Centrifuge 306 stage with the water, which can help aid in solid removal in a subsequent removal step. The water/oil washed mixture may be fed inline to a horizontal type centrifuge decanter that is designed to remove solids or contaminants in the oil. Alternative decanting methods, such as basket filtration or other centrifugation processes, can be used. The decanting is intended to remove gums and solids 308 that are precipitated from the oil with the small addition of water.

The process 300 may feed the water treated mixed oil to Chemical Mixing stage(s) 312 where an acid is added to the water treated oil mixture. The mixture is mixed vigorously through an inline dynamic high-shear mixer, and inline fed to a subsequent stage. Alternatively, other mixing methods such as flow-through restriction via an inline static mixer or aggressive agitation may be used. The acid added may be phosphoric acid that is added to the oil based on the level of phosphorus in the oil. Additional water typically is added during this stage. The total concentration of acid in water (including water added in the prior step) may vary from about 10-30%. Alternatively, other acids such as citric, oxalic, tartaric or other organic acids with some chelating ability may be added. Depending upon the oil being treated, acidity of the water phase is typically within a range of pH 1 to 3.5. For optimal removal of NHP, particularly phosphatidic acid (PA), a pH lower than the pKa of PA (approximately 2.6) is desired.

The material is then fed to a pH adjustment Reactor 314, where the acid/oil mixture is maintained for a period of time while continuing to be agitated and/or stirred to assure complete contact and to allow hydration to occur. This contact stage can last for a few minutes up to several hours. However, the acid/oil mixture continues to be stirred, recirculated or otherwise agitated to avoid settling or separation and ensure continued contact and interaction between the surface area of microbubbles of water and the oil/acid mixture formed during the mixing stage to cause the reaction to move the phosphorus out of the lipid containing phase and into the water phase. For example, the inline process may include optionally an additional shear mixer implementing a recycle loop to avoid settling and to keep the water droplets in the oil/acid mixture small and dispersed throughout the oil/acid mixture. In this pH adjustment stage 314 the acid treated oil mixture is fed to an inline stir tank and is mixed with the addition of an alkali substance, such as sodium hydroxide or with an acid such as phosphoric acid. The sodium hydroxide mixing partially neutralizes the water phase causing a change in the pH of the water phase to between about 4-7. The inline mixing during this pH adjustment stage is not vigorous like in the Chemical Mixing Stage(s) 312. Other alkali substances may be used, such as ammonium hydroxide or potassium hydroxide. Similarly, alternative processing may raise the pH to above neutral to remove free fatty acids (FFA) in feedstocks with FFA content below about 3%. Water may optionally be added to the mixture to allow a larger volume of liquid to remove contaminants in a subsequent stage (e.g., from 5-10% by volume of the oil). To avoid a significant amount of soapstock production, the optimal pH is well below the pka of the free fatty acids (FFAs). Likewise, to assure complete removal of hydrated gums, the pH is above the pKa of PA. Thus the pH is maintained from about 2.5 to 7 for optimal processing. Further, salts such as Sodium Sulfate and Sodium Chloride can be added in this stage to help reduce the stability of emulsions and improve downstream separation.

The adjusted pH oil mixture is fed to a centrifuge separator 316 (Centrifuge 1) in degumming to remove the water phase and gums 318 from the oil/water mixture. The separated waste water and gums 318 are sent to waste treatment.

The partially degummed oil is fed to a second Reactor 320 (Reactor 2) where the partially-degummed oil is optionally mixed with an additional chelating substance 322, such as ethylenediaminetetraacetic acid (EDTA) and sodium and potassium salts of EDTA, to further hydrate phospholipids for removal. The amount of EDTA added may typically be from 1-3 times the amount needed stoichiometrically based on remaining iron, calcium and magnesium. The EDTA is an aqueous solution, which may have a total amount of water from 2-5% volume basis related to the oil. Other chelate substances may be used, including a wide range of polycarboxylic acids and polymers. Optionally, the solution of EDTA may be a different salt (e.g., potassium). The EDTA solution may optionally be pH adjusted with an organic acid such as citric acid. In some implementations, a salt, such as Potassium Chloride, Potassium Sulfate, Sodium Chloride, or Sodium Sulfate, may optionally be added to limit the formation of emulsions.

In a second Centrifugation state 324 (Centrifuge 2) the chelate-mixed oil is centrifuged to remove the water phase 326. The removed water may contain the majority of the remaining gums.

The lipid containing phase may be fed to a third reactor 328 (Reactor 3). Water, from 2-5% relative to the lipid containing phase, may be added to wash the lipid containing phase prior to being fed into the inline centrifuge separator in the third centrifuge stage 332 (Centrifuge 3) where the water phase 334 is removed. Additionally, further chemical additives 330 may be added in this stage, for example such as chelating materials. Acid and base may be used to pH adjust the aqueous phase.

Drying and Bleaching

The double-cleaned oil may be fed to a vacuum flashing vessel 336 and/or a drying reactor 338, where it is subject to inline dehydrating at vacuum to remove essentially all remaining water with a target of 0.1-0.3%. The pressure of the mixture may be reduced to around 500 millimeters of mercury on an absolute scale. The mixture may be heated to 200 to 210 degrees F and held for 10 to 40 minutes. The vacuum can be achieved by a vacuum system 440, which generates a vacuum via a vacuum pump, steam ejector or similar process.

The vacuum can be achieved by a vacuum system 340, which generates a vacuum via a vacuum pump, steam ejector or similar process.

The dried oil may be fed to one or more Bleaching Reactors 342 following the vacuum drying, where the oil may be combined with an adsorbent material, for example such as bleaching clay ranging from 0.2% to 0.5% clay to the volume of oil. Other adsorbents such as silicas, activated carbon or finely powdered aluminas may also be used to address specially-required chemical actions including the removal of organic chlorides and sodium. The adsorbent is typically added at a rate of 0.2% to 0.5% of the total feed volume and held in residence while being agitated for 10 to 40 minutes. Other materials, such as filter aids, may be added to ease later recovery. The oil may then be sent to Bleaching Filters 346, where the oil may be filtered through a deep-cake Neutsche-type filter, a pressurized leaf filter or other types of filters (e.g., pressurized candle filters) in order to remove the adsorbent and any adsorbed contaminants.

The filtration may be aided by a filter precoat system 348, which deposits a filter aid on the filtering elements, using materials such as polymers, diatomaceous earth or other filter aids. This helps assure that all adsorbent is recovered and removed from the lipid containing substances.

The purified oil may be stored, at product storage 352, until delivery to customers, at 354.

Some embodiments feature a two-stage degumming process. In these embodiments, the first degumming stage uses a traditional phosphoric acid treatment followed by partial neutralization and centrifugation. The first degumming stage is followed by a second degumming stage using chelates. In some examples, the chelate is Ethylenediaminetetraacetic acid (EDTA).

This two-stage process may remove essentially all phosphorous (via phospholipids). Additionally, having two stages that are each able to remove a large amount of phospholipid provides a large amount of flexibility. Most edible oil facilities process one type of oil continuously. The disclosed technologies may process multiple types of oil. For example, a plant implemented process may handle animal fat one day, then corn oil the next and soy the following, and all are waste products with a lot more variability than an edible oil. These variabilities may include phospholipids, potassium, magnesium, sulfur, nitrogen, metals contamination levels, viscosity, and sediments in the feed oil. Each feed oil has different behavior, and in the event of an issue (e.g., the first stage forms emulsions and a lot of phospholipid gets carried over), there is the ability to complete degumming with the second stage.

FIG. 1 is a high-level block diagram of an oil refining process 100 according to some embodiments of the disclosed technologies. The elements of the disclosed processes are presented in one arrangement. However, it should be understood that one or more elements of the processes may be performed in a different order, in parallel, omitted entirely, and the like. Furthermore, the processes may include other elements in addition to those presented.

The oil refining process 100 may process many different feedstock types. For example, the feedstock types may include crude soybean oil, crude degummed soy oil, canola oil, palm oil, used cooking oil, corn oil, distillers corn oil, sorghum oil, rapeseed oil, camelina, beef tallow, fish oil, algal oil, yellow grease, some blends of brown grease, white grease, poultry fat, hog fat, and similar feedstock types. The finished product from the oil refining process 100 may be a deep degummed and super-bleached renewable diesel plant feedstock.

Referring to FIG. 1, the process 100 may include an acid degumming subprocess 101, a chelate degumming subprocess 102, and an adsorptive bleaching/drying subprocess 104. The process 100 may receive crude feed lipid-containing compounds (LCC) 106 as an input, and may produce purified LCC 126 as an output. The purified LCC 126 may serve as a feedstock to produce renewable fuels.

The degumming subprocesses 101, 102 may receive the crude feed LCC 106 as an input, and may degum the crude feed LCC 106 to produce degummed LCC 118 using water 108, acid 110, caustic 112, chelate 114, and similar inputs. Byproducts of the degumming subprocess 102 may include water, gums, and trace metals 116.

The acid degumming subprocess 101 may receive the crude feed LCC 106 as an input, and may degum the crude feed LCC 106 using water 108, acid 110, caustic 112, and similar inputs. For example, after treatment of the crude LCC with water 108 and acid 110, a caustic 112 may be used to partially neutralize the resulting acidic mixture. Centrifugation may be used to separate the water phase from the lipid containing phase. The water phase may then be removed.

The chelate degumming subprocess 102 may optionally receive the lipid containing phase produced by the acid degumming subprocess 101 as an input, and may degum the lipid containing phase using one or more chelates 114 to produce degummed LCC 118. In some embodiments, the chelates 114 may include EDTA.

The adsorptive bleaching/drying subprocess 104 may receive the degummed LCC 118 as an input, and may process the degummed LCC 118 to produce purified LCC 126 using bleaching clay 120 and similar inputs. Byproducts of the adsorptive bleaching/drying subprocess 104 may include spent clay and trace contaminants 122 and water 124.

The process 100 may include additional steps, for example including decanting, additional centrifugation, vacuum drying, filtering with bleached earth, and the like.

Figure 2:
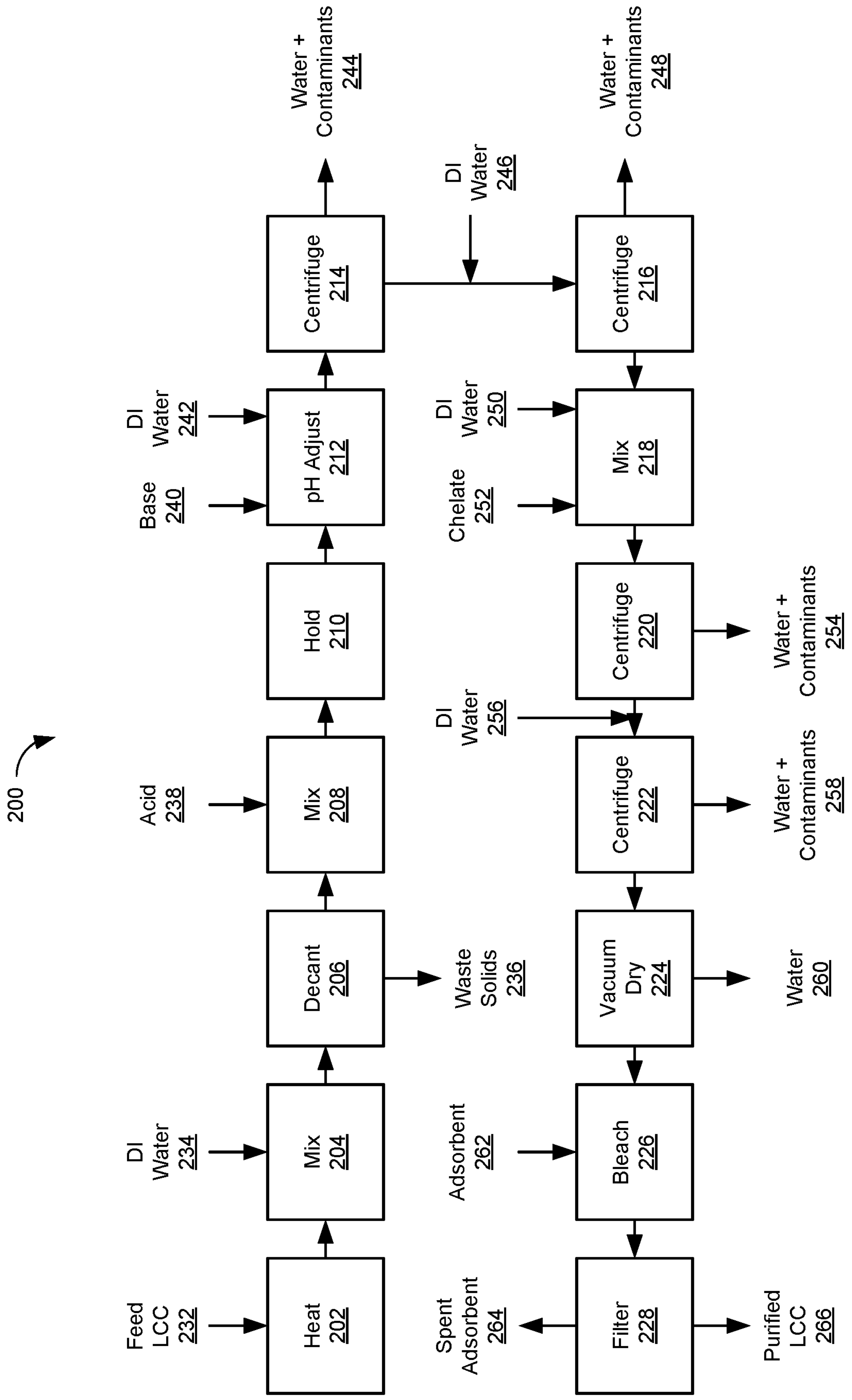
FIG. 2 is a detailed block diagram of a lipid containing compounds refining process, according to some embodiments of the disclosed technologies.

FIG. 2 is a detailed block diagram of an LCC refining process 200 according to some embodiments of the disclosed technologies. Referring to FIG. 2, the process 200 may begin with a feed LCC 232. The LCC 232 may be a rendered fat. For example, the LCC 232 may include at least one of: beef tallow; fish oil; algal oil; yellow grease; brown grease; white grease; poultry fat; and hog fat. The LCC 232 may have a free fatty acid content of less than 2% on an oleic acid basis.

The process 200 may include a heat subprocess 202. During this subprocess, the feed LCC 232 is heated to a processing temperature. The processing temperature may be 140-190 F. The heating may be implemented using a batch heating in tank or through an inline heat exchanger.

The process 200 may include a first mix subprocess 204. During this subprocess, water 234 may be added to the heated feed LCC. The water 234 may be deionized water. The added water 234 may be 1-2% by volume. The mixing may be implemented by an inline static mixer to ensure water distribution throughout the LCC. This mixing need be only vigorous enough to assure contact of the feed LCC and water. For example, this mixing may be implemented using a stirred tank or similar mixer. A solid filter aid may be added here for solid removal. For example, the solid filter aid may be polymer or a spent adsorbent such as bleaching clay.

The process 200 may include a decant subprocess 206. Here the water/LCC mixture may be fed to a decanter. The decanter may be a horizontal-type centrifuge designed to remove waste solids or contaminants 236 from the LCC. For example, the horizontal-type centrifuge may operate at a relatively low speed of ~2500-4000 RPM, and may be a machine in the 100-200 horsepower range. Alternatively, methods such as basket filtration or other centrifugation processes may be used here. This subprocess 206 may remove solids that are easily formed with a small addition of water. A countercurrent scroll may operate within the centrifuge's bowl to push solids to a discharge port. The cleaned LCC may proceed to a clean LCC discharge port. In some embodiments, a small addition of water may be used to help remove remaining hydratable phosphatide gums.

The process 200 may include a second mix subprocess 208. Here an acid 238 may be added to the mixture. For example, phosphoric acid may be added to the LCC mixture according to the level of phosphorus in the mixture. Alternatively, other acids may be used. For example, citric, oxalic, tartaric, or other organic acids with some chelating ability may be added. For most LCCs 0.3% concentrated acid will suffice. Additional water may be added. The total concentration of acid in water, including water 234 added during mix subprocess 204, may vary from 10-15%. Depending upon the LCC being treated, acidity of the water phase may fall within a range of 1-3.5 pH.

In this subprocess 208, the mixture may be mixed vigorously. For example, an inline dynamic high-shear mixer may be employed for the mixing. Alternatively, other mixing methods may be used. For example, flow-through restriction via an inline static mixer or aggressive agitation may be employed for the mixing.

The process 200 may include a hold subprocess 210. In this subprocess, the acid/oil mixture may be held for a hold interval to assure complete contact, and to allow hydration to occur. The duration of this hold interval may range between a few minutes and several hours. An additional shear mixer may be added here on a recycle loop, for example to keep the water droplets in the oil/acid mixture small. In some embodiments, the pH of the mixture may be reduced below the pKa of phosphaditic acid (PA). For example, the pH of the mixture may be reduced to lower than 2. This process breaks apart the PA-Ca or PA-Mg complexes that are oil soluble.

The process 200 may include a pH adjustment subprocess 212. In this subprocess, the mixture is partially neutralized with a base 240. For example, the base may be sodium hydroxide, ammonium hydroxide, potassium hydroxide, or similar alkali substances. The pH adjustment may bring the pH of the water phase to a range from 4-7. Alternatively, the mixing may raise the pH of the mixture above neutral, for example to remove free fatty acids in feedstocks with a free fatty acid (FFA) content below about 3%. Water 242 may be added to the mixture to allow a larger volume of liquid to remove contaminants. For example, the added water may range from 5-10% by volume of the oil mixture. The water 242 may be deionized water. The mixing in this subprocess need be only vigorous enough to assure contact between the base and the mixture. For example, this mixing may be implemented using a stirred tank or similar mixer. In some embodiments, the pH of the mixture may be increased above the pKa of phosphaditic acid (PA), but below that of full neutralization. The pH of the mixture may be increased to the range of 2.5 pH to 7 pH. The pH of the mixture may be increased to the range of 4 pH to 6 pH. This partial neutralization ensures a majority of free fatty acid in the mixture is not converted into soapstock. In contrast, current approaches employ full neutralization, taking the pH of the mixture well above 7. Such approaches are not useful with feedstocks having high levels of free fatty acids because free fatty acids would be present in the finished product at high levels.

The process 200 may include a first centrifuge subprocess 214. Here, the mixture is centrifuged and the water phase 244 is removed. The removed water phase 244 may be sent to waste treatment.

The process 200 may include a second centrifuge subprocess 216. Here, the cleaned oil may be washed with water 246 and centrifuged to further remove contaminants. For example, the added water may range from 2-10% by volume of the oil mixture. The water 246 may be deionized water.

The process 200 may include a third mix subprocess 218. Here, the partially degummed oil is optionally mixed with a chelate 252 to further hydrate phospholipids for removal. For example, the chelate 252 may be a sodium salt of EDTA, potassium, or similar salts. Vigorous mixing is not required. Only light mixing is needed. The solution may be pH-adjusted with an organic acid, for example such as citric acid.

A salt such as sodium chloride or sodium sulfate may be added, for example to limit formation of emulsions. Alternatively, other chelates known to someone skilled in the art may be used, for example including a wide range of polycarboxylic acids and polymers containing such acids. The amount of chelate 252 added may range from 1-3 times the amount needed stoichiometrically based on remaining iron, calcium, and magnesium. Water 250 may be added as well. For example, the added water may range from 2-5% by volume of the oil mixture. The water 246 may be deionized water.

The process 200 may include a third centrifuge subprocess 220. Here, the mixture may be centrifuged to remove the water layer 254, which may contain the majority of the remaining gums. The lipid containing phase may be retained.

The process 200 may include a fourth centrifuge subprocess 222. Here, the lipid containing phase may washed with water 256, from 2-5% by volume, and centrifuged again to remove water and contaminants 258. The water 256 may be deionized water.

The process 200 may include a vacuum dry subprocess 224. Here, the cleaned oil may be dehydrated at vacuum to remove water 260. For example, water remaining in the mixture after this subprocess may be approximately 0.1%.

The process 200 may include a bleach subprocess 226. Here, the oil may be combined with an adsorbent 262. The adsorbent may be bleaching clay. The added adsorbent may range from 0.4 to 0.6% of the oil by weight. Other materials, such as filter aids, may be added to ease later recovery.

The process 200 may include a filter subprocess 228. Here, the clay/oil mixture may filtered to remove the spent adsorbent 264 and any adsorbed contaminants. The filter may be a deep cake Neutsche type filter, a pressurized leaf filter, a pressurized candle filters, or other type of filter. The result is purified LCC 266. In some embodiments, this purified LCC 266 may have a free fatty acid content above 2%. In some embodiments, this purified LCC 266 may have a phosphorus content below 3 ppm.

What is claimed is:

1. A process for treating a lipid containing compound (LCC) that is an inedible rendered fat, the process comprising:

producing a first mixture that does not contain phospholipase enzyme having a pH lower than 2 by vigorously mixing an acid with the LCC; and producing a second mixture having a pH between 2.5 and 7 by adding a base to the first mixture, wherein a majority of free fatty acid in the second mixture is not converted into soapstock.

2. The process of claim 1, wherein the LCC comprises at least one of:

beef tallow;

fish oil;

yellow grease;

brown grease;

white grease;

poultry fat; and hog fat.

3. The process of claim 1, wherein the LCC has a free fatty acid content of more than 2% on an oleic acid basis.

4. The process of claim 1, further comprising:

separating an aqueous gum containing phase of the second mixture from a lipid containing phase of the second mixture.

5. The process of claim 4, further comprising:

removing the aqueous gum containing phase.

6. The process of claim 5, wherein removing the aqueous gum containing phase comprises:

centrifuging the second mixture.

7. The process of claim 4, further comprising:

producing a degummed LCC containing less than 30 ppm phosphorus by treating the lipid containing phase with an adsorbent material.

8. The process of claim 7, wherein:

the degummed LCC has a free fatty acid content above 2%, and a phosphorus content below 3 ppm.

9. The process of claim 7, further comprising:

vacuum-drying the lipid containing phase prior to treating the lipid containing phase with an adsorbent material.

10. The process of claim 4, further comprising:

contacting the lipid containing phase with at least one chelate wherein the lipid containing phase contains less than 30 ppm phosphorus.

11. The process of claim 1, wherein producing a first mixture having a pH lower than 2 pH further comprises:

mixing the LCC with water and decanting the mixture of the LCC and water prior to mixing the acid with the LCC.

12. The process of claim 11, wherein:

the water is deionized water.

13. The process of claim 7, further comprising:

removing spent adsorbent material from the lipid containing phase.

14. The process of claim 7, further comprising:

holding the lipid containing phase for a selected interval before treating the lipid containing phase with the adsorbent material.

15. The process of claim 10, further comprising:

centrifuging the lipid containing phase after contacting the lipid containing phase with the chelate.

16. The process of claim 1, wherein the acid comprises at least one of:

phosphoric acid;

citric acid;

oxalic acid; and tartaric acid.

17. The process of claim 1, wherein the base comprises at least one of:

sodium hydroxide;

potassium hydroxide; and ammonium hydroxide.

18. The process of claim 1, wherein producing a first mixture having a pH lower than 2 pH by vigorously mixing an acid with the LCC comprises:

treating the lipid-containing compound with water and the acid, producing an acidic mixture.

19. The process of claim 6, wherein treating the lipid-containing compound with water and acid comprises:

creating a third mixture of the lipid-containing compound and the water by mixing water with the lipid-containing compound;

decanting the third mixture of the lipid-containing compound and the water; and mixing the acid with the decanted mixture.

20. The process of claim 7, wherein the adsorbent material is at least one of:

a polymer;

hydrated silica; and bleaching clay.

21. The process of claim 10, wherein the at least one chelate comprises at least one of:

sodium salts of Ethylenediaminetetraacetic acid (EDTA);

potassium salts of EDTA;

EDTA;

polymers containing carboxylic acids;

sodium chloride; and sodium sulfate.

22. The process of claim 1, further comprising: producing the second mixture having a pH between 4 and 6.

* * * * *